Oct. 13, 1936.  F. H. OWENS  2,057,051
METHOD OF DRAWING AND PHOTOGRAPHING STEREOSCOPIC PICTURES IN RELIEF
Filed Aug. 11, 1934  2 Sheets-Sheet 1

Inventor
Freeman H. Owens.
By Emery, Booth, Varney & Holcombe
his Attorneys

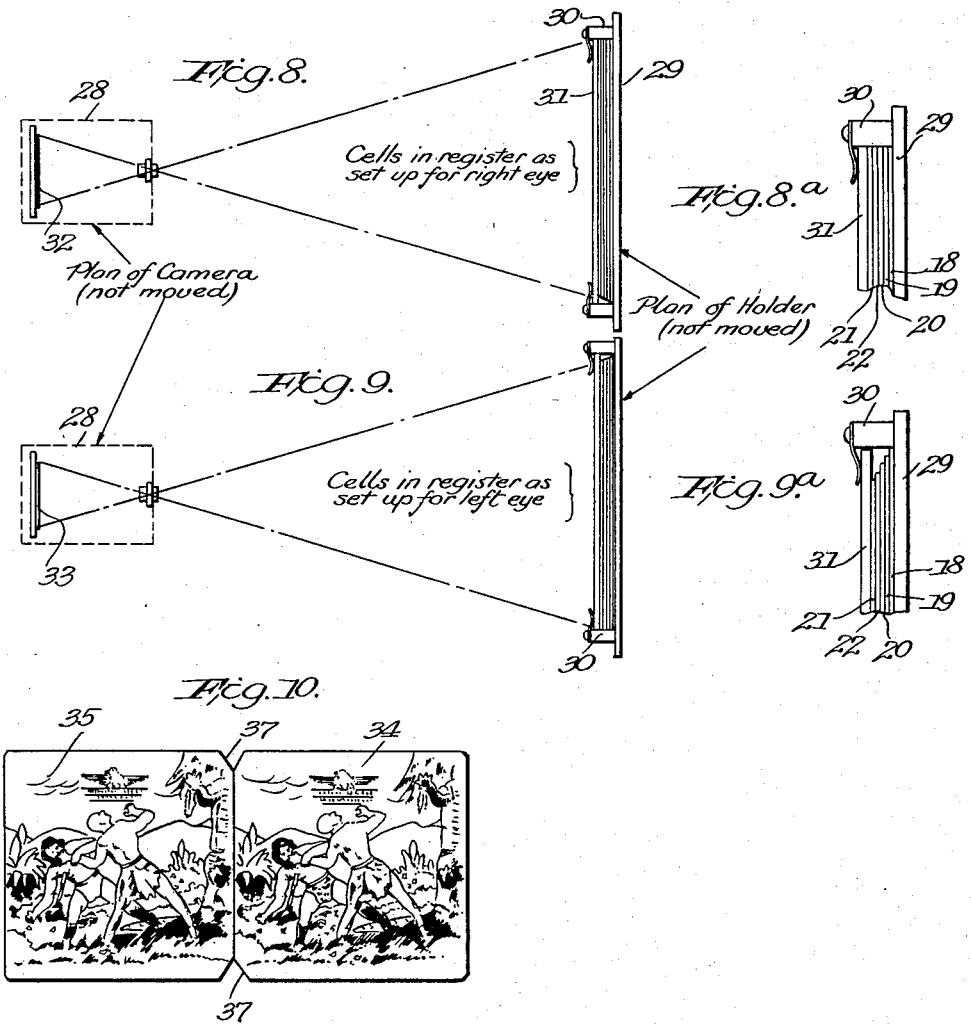

Patented Oct. 13, 1936

2,057,051

UNITED STATES PATENT OFFICE 2,057,051

METHOD OF DRAWING AND PHOTOGRAPHING STEREOSCOPIC PICTURES IN RELIEF

Freeman H. Owens, New York, N. Y.

Application August 11, 1934, Serial No. 739,484

11 Claims. (Cl. 88—29)

This invention relates to improved stereoscopic pictures intended for amusement, educational and advertising purposes having objects displayed in sharp relief in the foreground and background, and aims to produce such pictures by combining drawings or photographs of different subjects or views in a simple, rapid and inexpensive manner readily adapted to the existing types of cameras and picture making devices.

Further aims and objects of the invention appear in connection with the following description of a preferred mode of production and use, illustrated in the accompanying drawings, the subject chosen for illustration being a newspaper drawing depicting a popular character of serial adventure stories as utilized for giving publicity to a well-known nationally advertised product.

Referring to the drawings:

Figs. 8 and 9 are diagrams showing the assembling and photographing of the background and various picture units to make the right and left eye pictures of a pair of stereoscopic relief views embodying my invention;

Figs. 8a and 9a are enlarged details of portions of Figs. 8 and 9; and

Fig. 10 is a front view of a folded picture strip showing completed pairs of such views;

Figure 1:
Fig. 1 is a reproduction of a newspaper cartoon drawing.

The picture shown in Fig. 1 is a natural scene having clouds and mountains in the background, trees and vegetation in the middle ground, and natives or other beings in action in the foreground, and is typical of many such pictures, whether fanciful or copied from nature or a photograph. Other subjects suitable for my invention may have buildings in the background, and groups of people in the middle ground, or objects of interest such as boats, airplanes and automobiles, and well known personages in the foreground.

Figure 2:
Fig. 2 is a view of the same drawing after it has been prepared for reproduction as a stereoscopic relief picture.

In Fig. 2 I show the same natural scene with the background and different parts of the middle ground and foreground distinctively marked to separate them one from another for convenience in making a suitable number of separate tracings of each part of the picture at approximately the same distance from the eye of the observer. For example, the background 11, consisting of clouds and distant mountains, is covered with horizontal lines; the distant trees 12 and adjacent areas of the picture or covered with lines sloping down and to the right. The tree 13, creature 14 and adjacent objects in the middle ground are covered with vertical lines, and the man 15 in the foreground and foremost vegetation 16 are covered with lines sloping down and to the left, the desired display matter 17 being drawn in on the picture to appear prominently in the foreground or other appropriate place.

Figure 3:
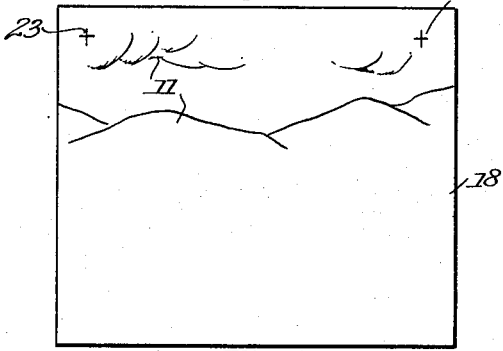
Fig. 3 is a view of the background picture unit.
Figure 4:
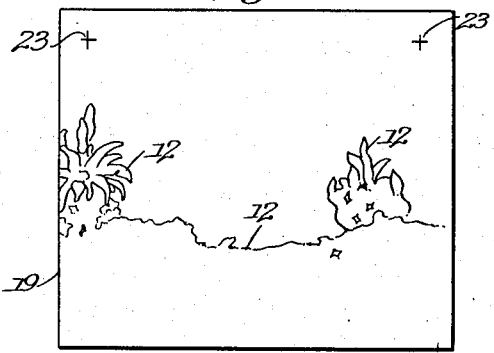
Figs. 4, 5 and 6 are views of the transparent picture units or cells, showing the middle rear ground, middle ground, and foreground picture units respectively.
Figure 5:
Figure 6:
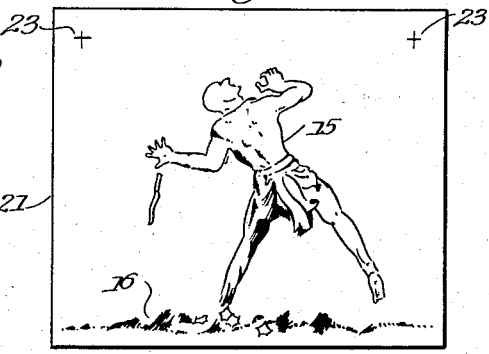
Figure 7:
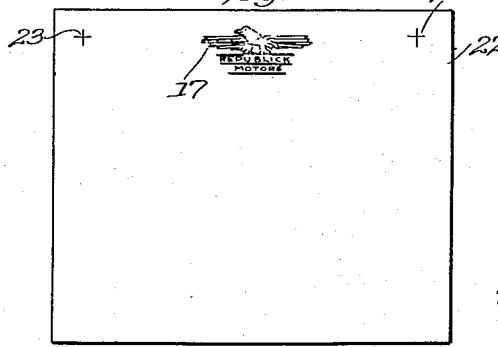
Fig. 7 is an intermediate or foreground unit upon which there is shown a design adapted to be introduced into the composite picture at an appropriate place.

In Fig. 3, the background 11 is shown by itself on a copying card 18. This may be copied in an enlarging camera or drawn by hand. Figs. 4, 5, 6 and 7 show the respective parts of the middle ground and foreground, which are copied on separate transparent sheets, 19, 20, 21, and 22 advantageously celluloid or like materials, and opaque on the back to correspond with the outline in each case. This copying may be done by hand, as great accuracy is not essential. The procedure in making these outline drawings on transparent sheets, termed "cells", is well known in the animated cartoon branch of the motion picture film industry.

Register marks 23 are placed on the picture, and on the background and each cell. These register marks enable the cells to be assembled one over the other in proper place for photographing to make a composite picture thereof. If preferred, one of the foreground cells may also carry the design 17 or slogan for advertising purposes.

The dissecting of the picture, as shown in Figs. 2 to 7, requires some artistic sense of values, but does not require great skill, and may be done rapidly and largely mechanically. Different transparent colors are preferably used instead of the lines shown in Fig. 2, for greater convenience and contrast in making the several foreground cells or copying units needed in carrying out the process, and thereby the copies may be made by photographing through color screens in a well known manner.

The recombining and copying to make the pair of stereoscopic views may be done as illustrated in Figs. 8 and 9, the camera 28 being any good copying camera, but the holder 29 must be equipped not only for securely holding the transparent copies in register, but for permitting them to be shifted laterally with reference to the background after making the first copy, each a trifle more than the preceding one working in the direction away from the holder toward the camera, so as to make a second copy in the shifted position. This produces a slight difference in the two views, and gives the stereoscopic effect and relief desired when viewed through a stereoscope or other viewing device provided with suitable lenses.

In the device illustrated, the holder has clamps 30 and a front glass 31, behind which the cells 21, 22, 20, 19 and 18 are arranged in the order named, as shown in Figs. 8 and 8a, in order to produce the composite picture to be viewed with the right eye, after which they are shifted to the right, as shown in Figs. 9 and 9a in order to produce the composite picture to be viewed with the left eye, the cells nearer the camera being slightly less in width than those nearer the background in order to permit the necessary movement between the edge clamps 30, which serve as register posts.

The prints 34, 35, from the negatives 32, 33, thus produced in the two settings of the dissected parts of the picture are advantageously printed or mounted side by side on a strip of paper or suitable material.

The expression "side by side" used in the claims with reference to the mounting of the right hand and left hand picture images has reference to the relative positioning of the two images at laterally spaced intervals suitable for viewing simultaneously by both eyes and does not mean that they must be contiguous or adjacent so as to touch at the side edges, as obviously they may have to be spaced apart if small in size.

My invention may be applied to any subject capable of being drawn or photographed on a flat surface, and in general each picture will depict two or more different subjects which may or may not have a common scene, motif or association of ideas. In the subjects chosen for illustration, there is no common relationship, the advertising sign being quite extraneous to the scene, character and action of the picture, and being all the more striking because of the incongruity and sharp relief. But many subjects that may be readily combined by judicious selection following the teaching of my invention will have a common interest and greatly augment the amusement and educational value of stereoscopic pictures.

I claim the following as my invention:

1. The process of producing stereoscopic pictures which comprises separating a flat picture into a plurality of sections representing portions of the picture of seemingly like distance from the point of view, making copies of said sections each upon a separate transparent sheet, superimposing said sheets in register for simulating the appearance of the original view as seen by one eye and copying the same with accuracy, making a second accurate copy of the same after shifting said superposed sheets laterally to simulate the appearance of the original views as seen by the other eye, and mounting said first and second copies side by side for viewing in a stereoscope.

2. The process of producing stereoscopic pictures which comprises separating a flat picture into a plurality of sections representing portions of the picture of seemingly like distance from the point of view, making copies of said sections each upon a separate transparent sheet, superimposing said sheets in register for simulating the appearance of the original view as seen by one eye and copying the same photographically, making a second copy of the same after shifting said superposed sheets laterally to simulate the appearance of the original view as seen by the other eye, and mounting said first and second copies side by side for viewing in a stereoscope.

3. The process of producing stereoscopic pictures which comprises separating a flat picture into a plurality of sections representing portions of the picture of seemingly like distance from the point of view, making copies of said sections each upon a separate transparent sheet, each sheet having like dimensions excepting that the sheets depicting the foreground are respectively shorter than those representing portions of the picture further away from the point of view, superimposing said sheets in register with the shorter foreground sheets respectively in front of the longer sheets and in alinement at one side and copying the same photographically, making a second copy of the same after shifting said superposed sheets laterally to bring said sheets into alinement at the opposite side, and mounting said first and second copies side by side for viewing in a stereoscope.

4. In the process of producing a set of complementary stereoscopic pictures for viewing in a stereoscope from a flat copy, the step of coloring the flat copy with distinctive colors each depicting the portions of the background or foreground appearing at an equal distance from the eye of the observer and copying the portions of the same color upon separate sheets, combining said copies photographically to register upon a single plate as seen by one eye and upon a second plate as seen by the other eye, and reproducing the two images thereby produced upon adjacent areas of a viewing field.

5. The process of producing stereoscopic pictures which comprises separating a flat picture into a plurality of sections representing portions of the picture of seemingly like distance from the point of view, making replicas of said sections each upon a separate sheet, superimposing said replicas in register for simulating the appearance of the original view as seen by one eye and reproducing the same with accuracy, making a second reproduction of the same after shifting said superposed replicas laterally to simulate the appearance of the original view as seen by the other eye, and mounting said first and second reproductions or copies thereof side by side for viewing in a stereoscope.

6. In the process of producing a set of complementary stereoscopic pictures of a scene or subject from a flat or non-stereoscopic view thereof, the step of separating the flat view into parts each depicting the portions of the background or foreground appearing at an equal distance from the eye of the observer, placing a register mark upon said view, and copying the respective parts upon separate sheets each carrying a register mark corresponding to that on said view, whereby said sheets may be superposed to simulate the original scene as viewed with either eye.

7. The process of producing a set of complementary stereoscopic pictures of a scene or subject from a flat or non-stereoscopic view thereof, comprising separating the flat view into sections each depicting the portions of the background or foreground appearing at an equal distance from the eye of the observer, providing said view with a register mark, copying the respective sections depicting portions of the same distance from the observer each upon a separate sheet carrying a register mark corresponding to that on said view, superposing said sheets and alining them by said register marks to form an image of said scene as seen by one eye and to form a second image as seen by the other eye, and separately reproducing these two images for visual observation.

8. The process of producing pictures with stereoscopic effect which comprises separating a flat picture into a plurality of sections representing portions of the picture of seemingly like distance from the point of view, making copies of the foreground sections each upon a separate sheet, superimposing said sheets and background in register for simulating the appearance of the original view as seen by one eye and copying the same, making a second copy of the same after shifting said superposed sheets laterally with reference to the background to simulate the appearance of the original view as seen by the other eye, and reproducing said copies for visual observation.

9. The process of producing pictures with stereoscopic effect which comprises superposing on a suitable background views of the foreground objects at like distances from the observer, photographing said superposed views, shifting said views of the foreground objects laterally to simulate the appearance from a different viewpoint and photographing them a second time, and reproducing said pair of composite photographs to be viewed with both eyes.

10. The process of producing pictures with stereoscopic effect from a non-stereoscopic picture which comprises making a plurality of views of the foreground and middleground objects, the foreground objects being on one view and the middleground objects on another, opaquing the outlined portions of said views and superposing them on the background picture as seen by one eye, copying the composite picture thus formed, repeating the process with the views superposed as seen by the other eye, and reproducing said pair of composite pictures to be viewed with both eyes.

11. The process of producing pictures with stereoscopic effect from a non-stereoscopic picture which comprises making a plurality of views of the foreground and middleground objects, the foreground objects being on one view and the middleground objects on another, superposing said views on the background picture as seen by one eye, copying the composite picture thus formed, repeating the process with the views superposed as seen by the other eye, and reproducing said pair of composite pictures to be viewed with both eyes.

FREEMAN H. OWENS.